United States Patent [19]

Hansen, Jr. et al.

[11] Patent Number: 4,773,523
[45] Date of Patent: Sep. 27, 1988

[54] METHOD FOR AUTOMATED HANDLING OF MATERIALS SUCH AS AUTOMOTIVE PARTS AND SYSTEM UTILIZING SAME

[75] Inventors: Robert E. Hansen, Jr., New Baltimore; Dennis J. Kosovec, Utica; Stephen G. LaMarre, Rochester; Malcolm S. Mills, Lake Orion, all of Mich.

[73] Assignee: GMF Robotics Corporation, Auburn Hills, Mich.

[21] Appl. No.: 863,034

[22] Filed: May 14, 1986

[51] Int. Cl.4 .............................................. B65G 47/00
[52] U.S. Cl. .................... 198/420; 198/465.2; 414/786; 901/7; 901/8
[58] Field of Search ............... 414/786, 331, 403, 404; 901/7, 8; 198/419, 420, 465.1, 465.2, 431

[56] References Cited

U.S. PATENT DOCUMENTS

| | | | |
|---|---|---|---|
| 4,068,766 | 1/1978 | Schmitt | 198/420 X |
| 4,341,298 | 7/1982 | Dingli | 198/419 |
| 4,566,837 | 1/1986 | Shiomi et al. | 198/465.1 X |
| 4,623,296 | 11/1986 | McGuire et al. | 901/7 X |
| 4,626,165 | 12/1986 | Nakashima et al. | 414/735 |
| 4,684,312 | 8/1987 | Antoszewski et al. | 414/735 |

FOREIGN PATENT DOCUMENTS 269459 11/1963 Australia .................... 198/419

Primary Examiner—Robert J. Spar
Assistant Examiner—Donald W. Underwood
Attorney, Agent, or Firm—Brooks & Kushman

[57] ABSTRACT

A method and apparatus are disclosed for the automated loading of parts wherein multiple gantry robots are utilized to pick up automotive parts from movable transfer beds and placed into predetermined positions in containers which are serially indexed through the work envelopes of the robots until the containers are full. In the disclosed embodiment, the method and system are utilized for racking automotive parts after they exit a sheet metal stamping machine. Preferably, empty containers are automatically delivered to a container queue such as by an automatic guided vehicle system (AGVS) at an unloading station adjacent the robots. Thereafter each AGV is moved to a loading station to receive and retain thereon containers loaded with parts by the gantry robots.

15 Claims, 4 Drawing Sheets

METHOD FOR AUTOMATED HANDLING OF MATERIALS SUCH AS AUTOMOTIVE PARTS AND SYSTEM UTILIZING SAME

TECHNICAL FIELD

This invention relates to method and apparatus for automated handling of materials such as automotive parts and, in particular, to method and apparatus for automated loading of automotive parts into containers adapted to receive such parts.

BACKGROUND ART

The predominate approach today to introduce factory automated technology into manufacturing is to selectively apply automation and to create islands of automation. The phrase "islands of automation" has been used to describe the transition from conventional or mechanical manufacturing to the automatic factory. Interestingly, some appear to use the phrase as though it were a worthy end object. On the contrary, the creation of such islands can be a major impediment to achieving an integrated factory.

Manufacturing examples of islands of automation often include numerically controlled machine tools; robots for assembly, inspection, painting, and welding; lasers for cutting, welding and finishing; sensors for test and inspection; automated storage/retrieval systems for storing work-in-process, tooling and supplies; smart carts, monorails, and conveyors for moving material from work station to work station; automated assembly equipment and flexible machining systems. Such islands are often purchased one at a time and justified economically by cost reductions.

To integrate the islands of automation it is necessary to link several machines together as a unit. For example, a machine center with robots for parts loading and unloading can best be tied to visual inspection systems for quality. Computer numerical control machine tools can all be controlled by a computer that also schedules, dispatches, and collects data. Selecting which islands to link can be most efficiently pursued on the basis of cost, quality and cycle time benefits.

In some cases the islands of automation will be very small (e.g. an individual machine or work station). In other cases the islands might be department-sized.

From a systems viewpoint, islands of automation are not necessarily bad, so long as they are considered to be interim objectives in a phased implementation of an automated system. However, to obtain an integrated factory system, the islands of automation must be tied together or synchronized. Systems synchronization frequently occurs by way of a material-handling system; it physically builds bridges that join together the islands of automation.

Automated material handling has been called the backbone of the automated factory. Other than the computer itself, this function is considered by many automation specialists as the most important element in the entire scenario of automated manufacturing. It is the common link that binds together machines, workcells, and departments into a cohesive whole in the transformation of materials and components into finished products.

To date, the major application for industrial robots has been material handling. Included here are such tasks as machine loading and unloading; palletizing/depalletizing; stacking/unstacking; and general transfer of parts and materials—for example, between machines or between machines and conveyors.

Robots are often an essential ingredient in the implementation of Flexible Manufacturing Systems (FMS) and the automated factory. The automated factory also will include a variety of material transportation devices, ranging from driver-operated forklifts to sophisticated, computer-operated, real-time reporting with car-on-track systems and color graphic tracking. These material transport systems serve to integrate workcells into FMS installations and to tie such installations and other workcells together for total factory material transport control.

With all of their versatility, robots suffer from a limitation imposed by the relatively small size of their work envelope, requiring that part work fixtures and work-in-process be brought to the robot for processing. Complete integration of the robot into the flexible manufacturing system requires that parts and subassemblies be presented to the robot on an automated transport and interface system. For example, installation of a machine tool served by a robot without an automated transport system will result in an inefficient island of automation needing large stores of work-in-process inventory for support, which are necessary to compensate for the inefficiencies of manual and fork truck delivery.

Robots may load and unload workpieces, assemble them on the transport, inspect them in place or simply identify them. The kind of activity at the robot or machine and material transport system interface dictates the transport system design requirements. One of the design variables relating to the interface includes accuracy and repeatability of load positioning (in three planes). Also, care in orienting the workpiece when it is initially loaded onto the transport carrier will save time when the work is presented to the robot or the tool for processing. Proper orientation of the part permits automatic devices to find the part quickly without "looking" for it and wasting time each time it appears at the workstation.

Fixtures may be capable of holding different workpieces, reducing the investment required in tooling when processing more than one product or product style on the same system.

The transport system must be capable of working within the space limitations imposed by building and machinery configurations, yet must be capable of continuous operation with the loads applied by a combination of workpiece weight, fixture weight, and additional forces imposed by other equipment used in the process.

The system must also have the ability to provide queuing of parts at the workstation so that a continuous flow of work is maintained through the process. Automatic queuing of transport carriers should provide gentle accumulation without part or carrier damage.

Robots and the machine tools they serve usually make up a large part of the cost of implementing an automated factory. Part of the justification for the investment is obtained through the ability to increase the operating time of equipment within the plant. With FMS's, the objective is to have machine tools cutting metal for 80% of the time instead of the historic 30%. Therefore, it is important that the materials transport system serving the robots and machine tools be capable of quickly moving into position with parts for loading into the machine, then quickly moving out of the workstation and on to downstream stations. Prompt transporter movements between stations allow work-in-process inventory to be minimized. Batch sizes are smaller and work faster with only a minimum of queuing at each workstation.

Tool changing by robots as an alternative to dedicated, automatic tool changers is becoming attractive owing to flexibility and relative lower cost. A robot equipped with special grippers can handle a large variety of tools, and the tools can be shared quickly by several machines.

For example, a robot which is positioned on a riser may load and unload two identical vertical milling machines with one of many tools. All the tools are stored in a rack in front of the robot between the two milling machines. The parts being machined are brought to the milling machines on auto transfer devices. The entire operation is controlled by a host computer that directs the robot controller and signals it which part type is coming to the robot and which set of tools to select to load and unload into the milling heads.

In designing a transport system, a determination must be made of how the parts are to be presented to the robot and to the workstation, and whether special carrier-top pallet designs are required. It is sometimes possible to move the parts already held in the same fixture that will be utilized by the machine tools during machining. The transport carrier is designed to accommodate chuck-like fixtures which are transferred from the carrier by a robot mounted directly on the machine or turning center. Rapid exchange of parts facilitates the integration of tools and the transport system into a smoothly functioning FMS.

A link for tying together some of the independently automated manufacturing operations is the automatic guided vehicle system (AGVS). The AGVS is a relatively fast and reliable method for transporting materials, parts or equipment. Guide path flexibility and independent, distributed control make an AGVS an efficient means of horizontal transportation. As an alternative to traditional conveying methods, the AGVS provides manufacturing management with a centralized control capability over material movement. Information available from the AGVS also provides management with a production monitoring data base.

Robot installations for transporter interface can be grouped into three principal categories: (1) stationary robots, (2) moving robots (on the floor or overhead), and (3) robots integral with a machine. The moving robots subdivide into two types. First are stationary robots, mounted on a transporter to move between work positions to perform welding, inspection, and other tasks. The second type of moving robot is the gantry unit that can position workpieces weighing more than one ton above the workcells and transport system. The system only has to deliver and pick up somewhere under the span of gantry movement.

A gantry robot can be described as an overhead-mounted, rectilinear robot with a minimum of three degrees of freedom (DF) and normally not exceeding six DF. The robot is controlled by a multi-microprocessor controller allowing it to interact with a multitude of other devices.

Large work envelopes, heavy payloads, mobility, overhead mounting, and the capability and flexibility to do the work of several pedestal-mounted robots are some of the advantages of implementing a gantry robot versus a floor or pedestal-mounted robot.

Gantry robots have been around for many years in various forms, from refueling systems in the nuclear reactor cell to large material-handling systems in the mining industry. There are also pseudogantry robots which are composed of primarily a pedestal robot mounted in the inverted position and on slides, allowing it to traverse over the work area. Since gantry robots are somewhat unique, some terms are used that do not pertain to pedestal robots, as follows:

Superstructure: Also called the gantry support structure or box frame. This is the structure upon which the robot will be elevated from the floor. It is an integral and essential portion of a gantry robot system.

Runway: The longitudinal X axis of the gantry robot. It is normally the passive side rails of the superstructure.

Bridge: The transverse or Y axis of the gantry robot. The bridge is an active member of the robot riding on the runway rails and supporting the carriage.

Carriage: The support structure for the Z axis. Provides the Y axis motion on the bridge.

Telescoping tubes/masts: Depending on the robot this is the vertical or Z axis of the gantry robot. In the case of telescoping tubes, they come together, allowing for a lower ceiling. A sliding mast slides along its length up and down, requiring a ceiling height equal to its stroke above the superstructure.

There are two major designs of gantry-style robots, the four-poster and the cantilever. The four-poster gantry has a complete overhead structure which covers the entire work envelope. The robot is mounted much the same as an underslung bridge crane. The axes consist of an X, Y, and direct vertical Z in Cartesian coordinates with optional wrists that enable straightforward programming and control.

Some of the advantages of the four-poster gantry are: (1) the design can be very modular, allowing for a wide range of sizes in both the X and Y axes; (2) design modularity of supports can allow for heavy payloads; (3) a large work envelope can be provided at a very reasonable cost; and (4) the Cartesian coordinates allow for application of a variety of proven software schemes, including CNC-type controls.

The alternative gantry style is the cantilever type. The basic advantages of this type of robot include: (1) modularity of the X axis, allowing for very long travel; (2) the ability to apply a rotary waist, making both sides of the gantry available as separate work spaces; (3) a programmable structure overhead, allowing clearance to load and unload parts from above using a crane or forklift, for example; (4) open accessibility from all directions, allowing conveyors, pallets, or part feeding from any direction; (5) design rigidity, permitting extreme accuracy and reliability for light machining tasks or routing applications; and (6) cartesian coordinates and rigid design combination, providing for application of CNC-type controller with the inherent accuracy to permit off-line programming.

The gantry can be linked to advanced computer control because it offers simplicity of movement and high accuracy. With the system's off-line programming capability, a marriage can be made with CNC machine tools for automatic reprogramming, making small-batch automation economically feasible.

The cantilevered gantry can be used with direct numerical or hierarchical control. It can be coupled with communication and supervisory computers in FMS or complete factory automation systems. The gantry robot can also be fitted with vision and adaptive or advanced sensory interfaces to provide real-time path modifications.

Today's gantry robots have the capability of handling very heavy payloads. Heavier payloads sometimes require stronger end effectors. End effectors for gantry robots sometimes can become very complex, since they can perform more than one task. These end effectors can become very heavy, thereby reducing the effective payload.

End effectors used in material handling such as palletizing include all of the conventional styles—standard grippers, vacuum cups, electromagnets—and many special designs to accommodate unusual application requirements. Dual-purpose tooling is often used to pick up separators or trays, as well as the parts being moved through the system.

Vacuum-type grippers and electromagnetic grippers are advantageous, because they permit part acquisition from above rather than from the side. This avoids the clearance and spacing considerations that are often involved when using mechanical grippers.

However, the use of vacuum and electromagnetic grippers is not without its problems since cycle time is not just a function of robot speed and its accelerating-/decelerating characteristics. Cycle time is dependent on how fast the robot can move without losing control of the load. Horizontal shear forces must be considered in the application of these grippers. This often means that the robot is run at something less than its top speed.

DISCLOSURE OF THE INVENTION

An object of the present invention is to provide an improved method and apparatus for the automated handling of material, such as automotive parts, in an environment which results in the production of high quality products.

Yet another object of the present invention is to provide an improved method and system for the automated handling of material, such as automotive parts, wherein the material flows in a planned and orderly fashion while, at the same time, reducing the amount of work in process.

Yet still another object of the present invention is to provide an improved method and system for automated handling of material, such as automotive parts wherein factory floor space can be utilized effectively while at the same time integrating with preexisting "islands of automation".

In carrying out the above objects and other objects of the present invention, a method for the automated loading of parts includes the steps of indexing a container into a first work envelope of a first robot having a gripper. The container is adapted to receive and retain a plurality of parts therein. At least one of the parts to be loaded is conveyed into the first work envelope. The first robot is controlled so that the first robot picks up and places the one part in a predetermined position in the container. The container is then indexed from the first work envelope into a second work envelope of the second robot having a gripper. At least one of the other parts to be loaded is then conveyed into the second work envelope. The second robot is then controlled so that the second robot picks up and places the one other part in a second predetermined position in the container. Then the container is moved out of the second envelope. Various ones of the above steps are repeated until all of the parts are loaded and the last container is moved out of the second envelope.

Further in carrying out the above objects and other objects of the present invention, a system for automatically loading parts into containers is provided. The system comprises first and second robots, each of which has a gripper. The robots are capable of working within their respective first and second work envelopes. The system further comprises indexing means for indexing a first container into the first envelope and, subsequently, serially indexing the first and second containers into the first and second work envelopes, respectively. Conveying means are provided for serially conveying parts to be loaded into the first and second work envelopes. First and second robot controllers control their respective robots so that the first and second robots pick up and place the parts in respective first and second predetermined positions in the containers when the containers are positioned within their respective work envelopes. A control means is coupled to the indexing and conveying means and to the controllers for controlling the flow of containers and parts in the system.

Preferably, the robots perform their work substantially simultaneously when the containers are positioned within their respective work envelopes.

Also, preferably, at least one other robot is provided with its respective controller to minimize the time in which a container is fully loaded with parts. A queuing mechanism provides a queue adjacent the first work envelope to ensure an uninterrupted flow of containers.

In the preferred embodiment, each of the robots comprises a gantry robot having a vacuum gripper connected to the distal end of its robot arm. The conveying means includes a plurality of transfer beds, each of which is adapted to support an automotive part having a particular configuration thereon in a fixed position and orientation prior to being picked up by one of the robots.

The advantages accruing to the use of such a method and system are numerous. For example, parts can be quickly moved and loaded into the part containers without having to store the parts. In this way inventory levels can be kept small. Also, the frequency of part movement is minimized thereby rendering it less likely that the parts to be loaded will be damaged.

The objects, features and advantages of the present invention are readily apparent from the following detailed description of the best mode for carrying out the invention when taken in connection with the accompanying drawings.

BEST MODE FOR CARRYING OUT THE INVENTION

Figure 1:
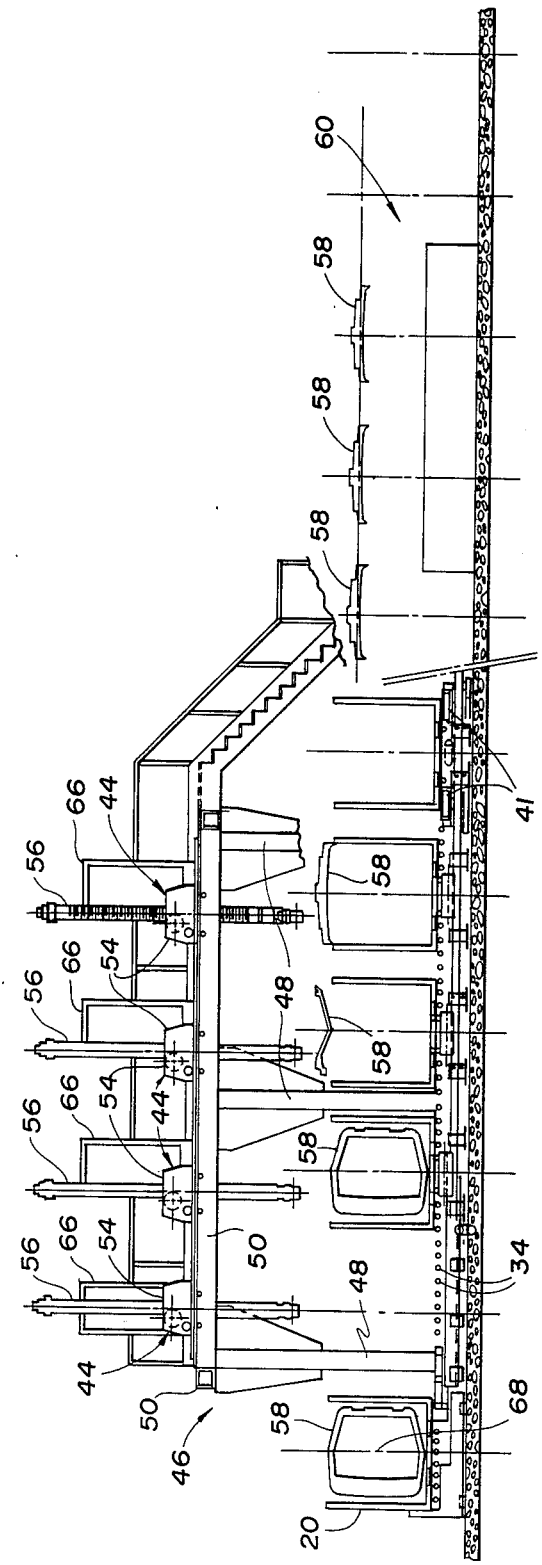
FIG. 1 is a side elevational view, partially broken away and in cross section, illustrating the method and system constructed in accordance with the present invention for automated handling of material such as automotive parts.

Referring to the drawings, there is illustrated in FIGS. 1 through 4, method and apparatus for automated handling of material such as automotive parts. Such parts may include stamped sheet metal parts such as roof panels, outer lids, panel compartments, outer lift windows, hatchbacks and the like. The method and system have particular utility in racking such automotive parts in containers after they have been stamped by a stamping machine.

Figure 3:
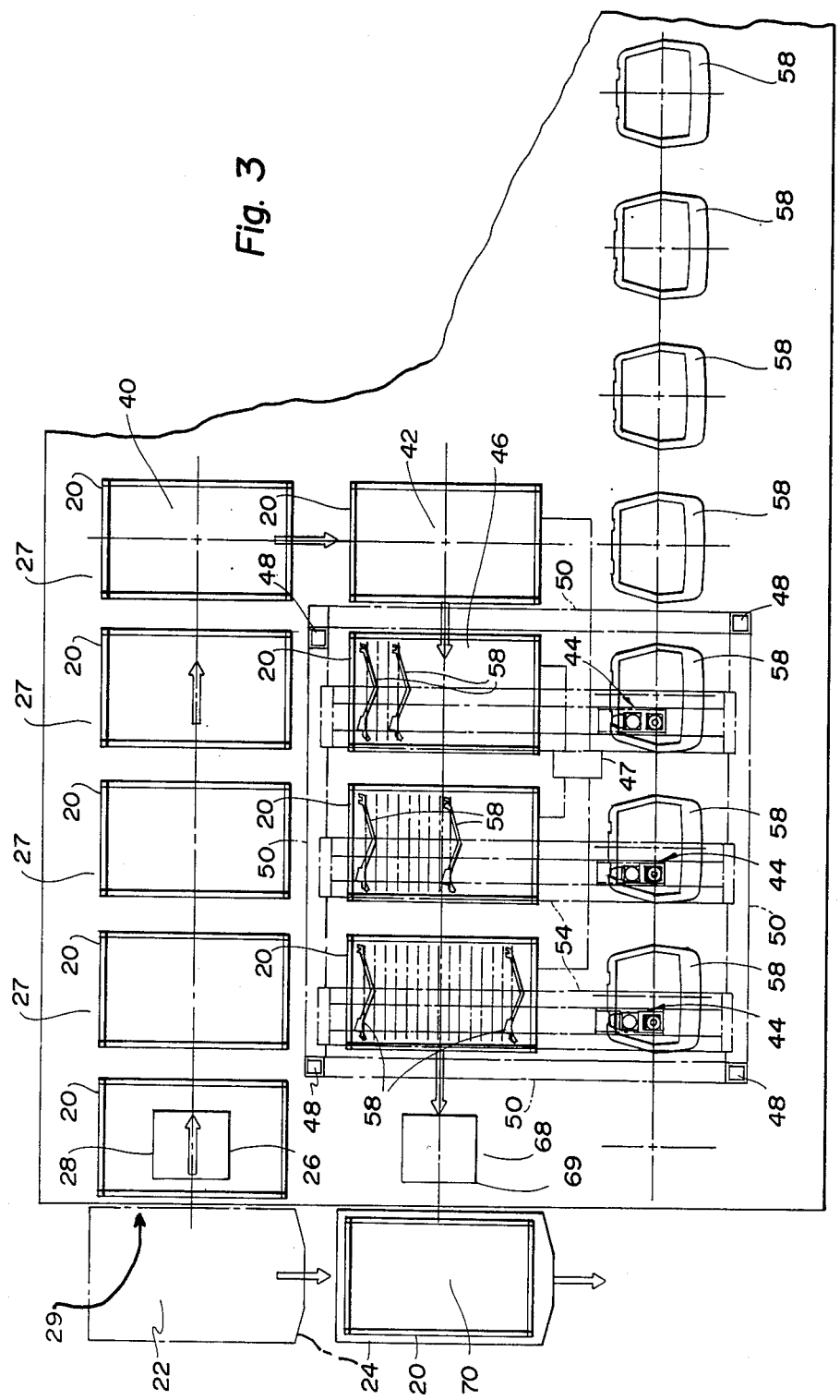
FIG. 3 is a top plan view, partially broken away, of the second system and which schematically illustrates the movement of containers and parts therein.

In general, empty containers, such as containers 20, are first carried to an unloading station 22 on automatic guided vehicles (AGV) 24 of an automatic guided vehicle system (AGVS) as shown in FIG. 3. However, it is to be understood that other methods and apparatus can be utilized to move the empty containers 20 to the unloading station 22, such as by conveyor or monorail, or even manually without departing from the spirit of the present invention.

From the unloading station 22 each empty container 20 is transferred off its respective AGV 24 by a conventional container transfer mechanism, generally indicated at 26 in FIG. 3. However, it is to be understood that the containers 20 may be transferred in any well-known fashion to a position 28 from the unloading station 22. As illustrated in FIG. 3, after each of the containers 20 is transferred off its respective AGV 24, each container enters waiting positions 27 within a queue, generally indicated at 29, in which the containers 20 are temporarily stored.

Figure 2:
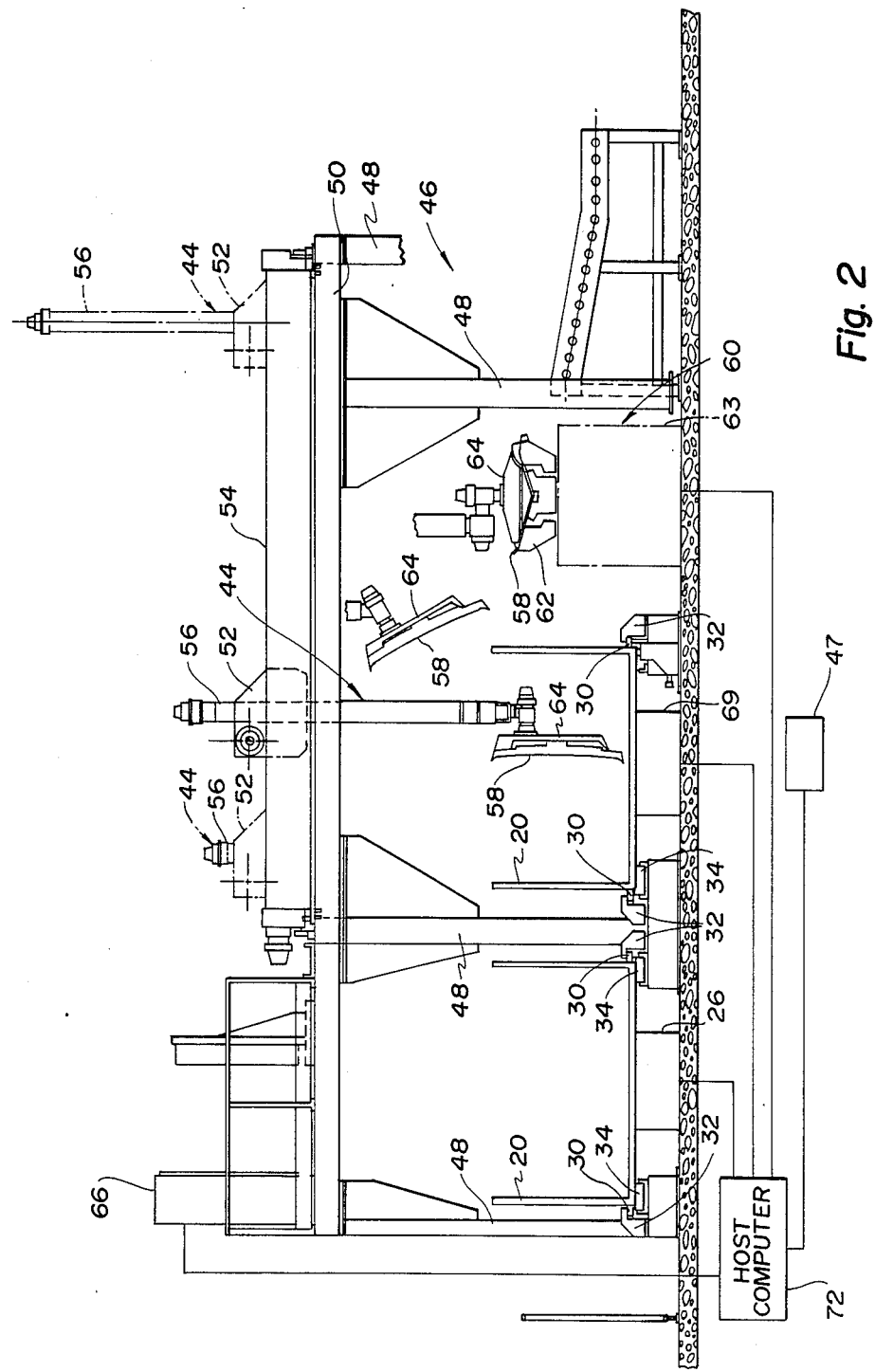
FIG. 2 is an end view, partially broken away and in cross section, of a second system similar to the first system but including only three robots and including a schematically illustrated host computer for controlling the various components of the system to thereby control the flow of containers and parts therein.

As best shown in FIG. 2, the queue 29 receives and retains the containers 20 as they move therein by means of locating rollers 30 which are rotatably supported between pairs of upwardly extending supports 32. Rotatably mounted support rollers 34 are also provided to permit conveyance of the containers 20 within the queue 29. The rollers 34 are driven by motors (not shown), to move the empty containers 20 within the queue 29. The containers 20 may be located within the queue by locating pins (not shown) or any other locating device at any of the particular stations illustrated in FIG. 3, so that the containers 20 do not strike one another.

The containers 20 "turn a corner" at a station 40 in the queue 29 with a set of vertically adjustable rollers 41, as best shown in FIG. 1. The rollers 41 extend perpendicular to the rollers 34 and are vertically adjustable so that when a container 20 is at the station 40, the container 20 is lifted upwardly off the rollers 34 by movement of the rollers 41 upwardly. After movement of the container 20 from the station 40 to a station 42, the rollers 41 are lowered so that the container is again resting on the rollers 34.

From the station 42 the containers 20 are serially indexed into the work envelope of a first gantry robot, generally indicated at 44, to a station 46 by a conventional indexing means or indexing mechanism, schematically indicated at 47 in FIG. 3. The indexing mechanism 47 may include locking fingers (not shown) for locking the container 20 in the station 46 after the container has indexed thereto.

The first gantry robot 44 as well as the other gantry robots 44 of the system, is supported by a superstructure, generally indicated at 46 in FIGS. 1 and 2. The superstructure 46 includes a plurality of vertical and interconnecting horizontal beams 48 and 50, respectively. Each gantry robot 44 includes a carriage 52 which is slidably mounted within its respective runway 54. None of the gantry robots 44 includes a transverse or Y axis, which is oftentimes termed a bridge, since each of the gantry robots 44 only moves in a longitudinal direction along its respective runway 54. Each of the gantry robots 44 also includes telescoping tubes or masts 56 which comprise a vertical or Z axis of the robot 44.

At the station 46, the container 20 is partially filled with automotive parts 58 which have been previously picked up by the first gantry robot 44 from a conveying means or mechanism, generally indicated at 60 in FIGS. 1 and 2. The conveying mechanism 60 preferably comprises a plurality of part support fixtures or transfer beds 62 which are connected in spaced relationship to an indexing conveyor or transfer rail 63. The upper surface of each of the transfer beds 62 is preferably formed to be complementary with the lower surface of each part 68 so that each part 58 is not only positioned properly, but also has a proper orientation for pickup by the gantry robots 44. Also preferably, the parts 58 are transferred by the transfer rail 63 through a combination of indexing steps, as is well known in the art.

Referring to FIG. 2, there is illustrated some of the various movements taken by a gantry robot 44 and its associated gripper 64 in picking up and placing a part 58 in a container 20. The gripper 64, which preferably comprises a vacuum gripper, has a lower surface which is also complementarily shaped to the upper surface of each of the parts 58.

Initially, after the gripper 64 has been positioned above the part 58 to be picked up, the robot 44 is controlled in a conventional fashion by its respective robot controller 66 to move downwardly along its Z axis to a position immediately above the part 58. Then the robot 44 is controlled so that vacuum pressure is provided at the gripper 64 to lift the part 58 from its transfer bed 62. Thereafter, the robot 44 moves through a lift stroke along its Z axis. The robot 44 is then controlled to rotate the part 58 and move the part 58 longitudinally towards the container 20. Thereafter, the robot 44 moves the part 58 through a loading downstroke. The air vacuum is then removed from the gripper 64 and the robot 44 reverses its prior movements to move to a position again above a part 58 on its transfer bed 62 which has indexed during loading of the prior part.

Second, third and any fourth gantry robots 44 are operative to load parts 58 only when there is a partially loaded container 20 within its work envelope to place parts 58 in predetermined positions within each of the containers 20 therein, as illustrated in FIG. 3. Obviously, the transfer rail 63 synchronously indexes the beds 62 through the work envelopes of the robots 44 so that after part loading each of the robots 44 has a new part 58 within its work envelope to thereby continue part loading on an uninterrupted basis.

After each container 20 is fully loaded by the last gantry robot 44, the container 20 is indexed out of the last work envelope to a station 68 as illustrated in FIG. 1. From the station 68 it is loaded onto an AGV 24 by a second conventional transfer mechanism 69 at a loading station 70 immediately adjacent the station 68 through a sequence of steps opposite the sequence of steps employed in transferring the empty container from the unloading station 22 to the station 28.

A control means or a programmed host computer, schematically illustrated at 72 in FIG. 2, is electrically coupled to each of the robot controllers 66, the first and second transfer mechanisms 26 and 69, the transfer rail 63 and the indexing mechanism 47 in order to synchronize motion of the containers 20, the transfer beds 60, the robots 44 and the containers 20. Also, the host computer 72 is typically an integral part of the AGVS of which the AGV 24 is a part.

Figure 4:
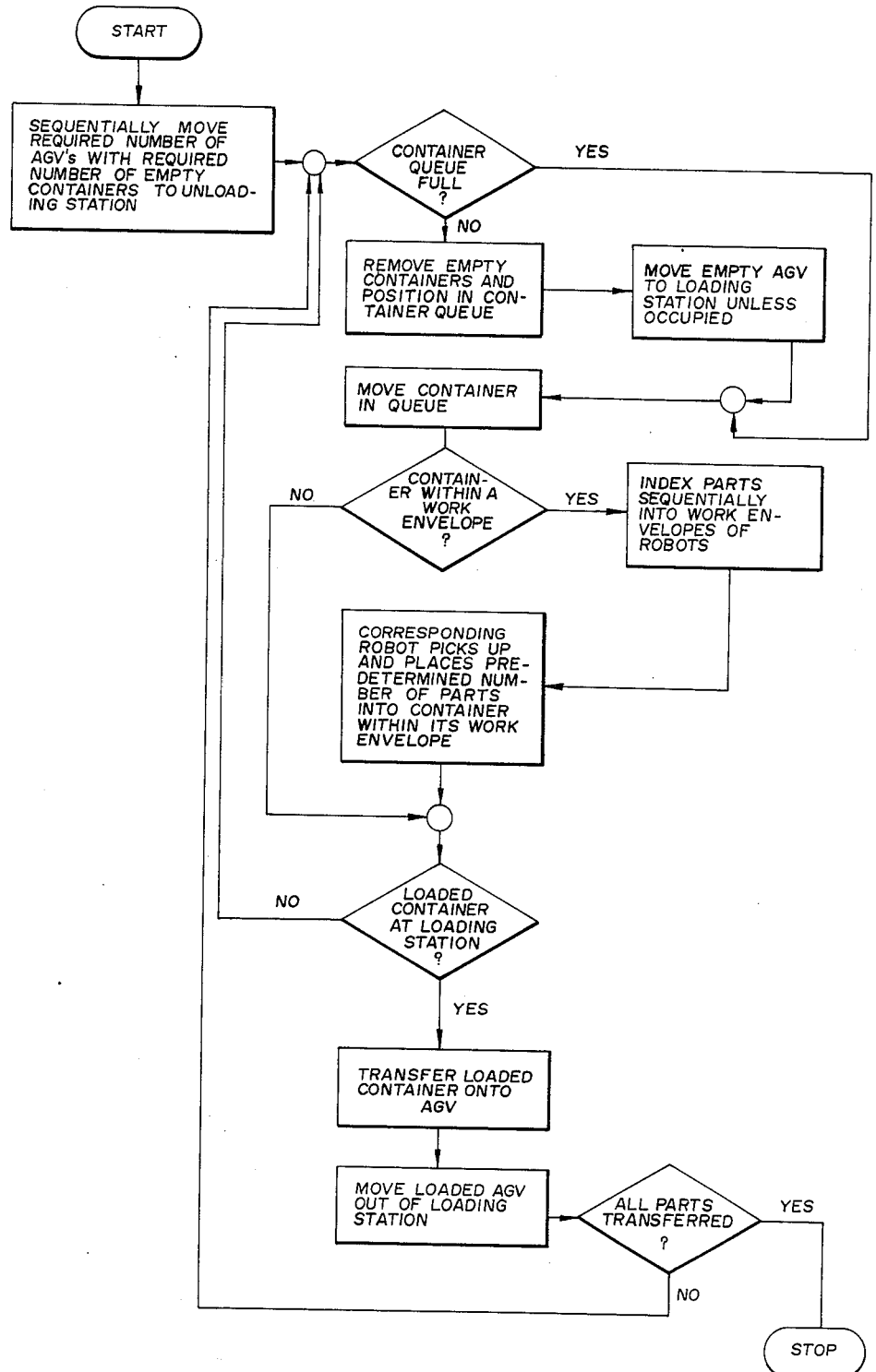
FIG. 4 is a flow chart, illustrating the various steps taken in performing the method of the present invention.

Referring now to FIG. 4, there is illustrated in block diagram form the various steps in the method of the present invention. The flow chart illustrated in FIG. 4 may be utilized in preparing a computer program utilized in controlling the motion of parts, containers and robots in the system.

The invention has been described in an illustrative manner and it is to be understood that the terminology which has been used is intended to be in the nature of words of description rather than of limitation.

Many modifications and variations of the present invention are possible in light of the above teachings. It is, therefore, to be understood that within the scope of the appended claims the invention may be practiced otherwise than as specifically described.

What is claimed is:

1. A method for the automated loading of parts, the method utilizing a robot system including first and second program-controlled robots, each robot having an arm provided with a gripper movable about three control axes and adapted to pick up one of the parts, the method comprising the steps of:
   (a) indexing a container adapted to receive and retain a plurality of parts therein into a first work envelope of the first robot;
   (b) conveying at least one part to be loaded into the first work envelope;
   (c) moving the gripper of the first robot about its three control axes to different positions along a first path to pick up and place the one part in a predetermined position in the container in the first work envelope;
   (d) indexing the container from the first work envelope into a second work envelope of the second robot;
   (e) iterating steps (a) through (c) with another container;
   (f) conveying at least one other part to be loaded through the first work envelope and into the second work envelope;
   (g) moving the gripper of the second robot about its three control axes to different positions along a second path to pick up and place the one other part in a second predetermined position in the container in the second work envelope;
   (h) moving the container out of the second work envelope;
   (i) iterating steps (d) and (f) through (h); and
   (j) iterating steps (a) through (i) until all of the parts are loaded and the last container is moved out of the second work envelope.

2. The method of claim 1 wherein steps (c) and (g) are performed substantially simultaneously when the containers are positioned within their respective work envelopes.

3. The method of claim 1 wherein steps (a) and (d) are performed substantially simultaneously.

4. The method of claim 1 further comprising the steps of:
   (k) indexing the container from the second work envelope into a third work envelope of a third robot having a gripper;
   (l) conveying at least one more part into the third work envelope; and
   (m) controlling the third robot so that the third robot picks up and places the one more part in a third predetermined position in the container in the third work envelope.

5. The method of claim 4 wherein the one more part is conveyed through the first and second work envelopes.

6. The method of claim 4 or claim 5 wherein steps (c), (g) and (m) are performed substantially simultaneously when the containers are positioned within their respective work envelopes.

7. The method of claim 4 wherein steps (a), (d) and (k) are performed substantially simultaneously.

8. The method of claim 1 or claim 5 further comprising the step of queuing the containers in a single queue.

9. A system for automatically loading parts into at least two containers, the system comprising:
   first and second program-controlled robots, each of said robots having an arm provided with a gripper movable about three control axes and adapted to pick up one of the parts, wherein said robots are capable of working within their respective first and second work envelopes;
   indexing means for indexing the first container into the first work envelope and subsequently serially indexing the first and second containers into the second and first work envelopes respectively;
   conveying means for serially conveying parts to be loaded into the first and second work envelopes wherein said conveying means extends through said first work envelope and into said second work envelope to convey parts through said first work envelope and into said second work envelope;
   first and second robot controllers for controlling their respective robots to move their respective grippers about the three control axes to different positions along a path to pick up and place the parts in respective first and second predetermined positions in the containers when the containers are positioned with their respective work envelopes; and
   control means coupled to said indexing and conveying means and to said controllers for controlling the flow of containers and parts in the system.

10. The system as claimed in claim 9 wherein the system automatically loads parts into at least three containers, the system further comprising:
   a third robot having a gripper and capable of working within a third work envelope; and
   a third robot controller for controlling the third robot, wherein said indexing means indexes the containers into the third work envelope from the second work envelope and wherein said conveying means conveys parts to be loaded into the third work envelope, said third robot controller controlling the third robot so that the third robot sequentially picks up and places the parts into third predetermined positions in the containers.

11. The system as claimed in claim 10 or claim 10 further comprising queuing means for queuing the containers in a queue, said indexing means indexing the containers in said queue.

12. The system as claimed in claim 10 or claim 9 wherein each of said robots comprises a gantry robot, and wherein said system further includes means for mounting said gantry robots in an overhead fashion.

13. The system as claimed in claim 10 or claim 9 wherein each of said grippers comprises a vacuum gripper connected to the distal end of its robot arm.

14. The system as claimed in claim 10 or claim 9 wherein said control means includes a host computer for coordinating operation of said indexing and conveyor means and said robot controllers.

15. The system as claimed in claim 11 further comprising a plurality of automatic guided vehicles coupled to said control means for providing empty containers to said queuing means and for receiving loaded containers therefrom.

* * * * *